(12) United States Patent
Greenland, II et al.

(10) Patent No.: US 8,639,614 B2
(45) Date of Patent: Jan. 28, 2014

(54) SYSTEM AND METHODS FOR TRADING COMPLEX FINANCIAL PRODUCTS

(75) Inventors: J. Kingsley Greenland, II, Norfolk, MA (US); William J. Jakubowski, Charlestown, MA (US)

(73) Assignee: The Debt Exchange, Inc., Boston, MA (US)

( * ) Notice: Subject to any disclaimer, the term of this patent is extended or adjusted under 35 U.S.C. 154(b) by 866 days.

(21) Appl. No.: 11/647,582

(22) Filed: Dec. 29, 2006

(65) Prior Publication Data

US 2008/0162337 A1 Jul. 3, 2008

(51) Int. Cl.
*G06Q 40/00* (2012.01)

(52) U.S. Cl.
USPC .................. 705/38; 705/35; 235/379

(58) Field of Classification Search
CPC ..................................... G06Q 40/025
USPC ...................... 705/35, 38; 235/379
See application file for complete search history.

(56) References Cited

U.S. PATENT DOCUMENTS

| | | | |
|---|---|---|---|
| 5,500,793 A | 3/1996 | Deming, Jr. et al. | |
| 5,664,115 A | 9/1997 | Fraser | |
| 5,940,812 A | 8/1999 | Tengel et al. | |
| 5,966,699 A | 10/1999 | Zandi | |
| 5,995,947 A | 11/1999 | Fraser et al. | |
| 6,208,979 B1 * | 3/2001 | Sinclair | 705/38 |
| 6,233,566 B1 | 5/2001 | Levine et al. | |
| 6,415,269 B1 | 7/2002 | Dinwoodie | |
| 6,691,094 B1 | 2/2004 | Herschkorn | |
| 7,249,089 B2 | 7/2007 | Mendizabal et al. | |
| 7,389,294 B2 | 6/2008 | Kotas et al. | |
| 7,627,500 B2 | 12/2009 | Zhang et al. | |
| 2001/0054022 A1 | 12/2001 | Louie et al. | |
| 2002/0052814 A1 | 5/2002 | Ketterer | |
| 2002/0143687 A1 | 10/2002 | Bahar | |
| 2004/0215540 A1 | 10/2004 | Buxton | |
| 2005/0144119 A1 * | 6/2005 | Monsen et al. | 705/38 |
| 2006/0218070 A1 | 9/2006 | Lange | |
| 2007/0043659 A1 | 2/2007 | Kass et al. | |

* cited by examiner

*Primary Examiner* — Daniel Felten
(74) *Attorney, Agent, or Firm* — McKenna Long & Aldridge LLP

(57) ABSTRACT

A system for managing the formation of and transactions relating to a syndicated loan is described which provides an interface for all active and prospective participants of a syndicated loan to interact with the system an each other, thereby making the syndication process more efficient and dynamic. In addition, a trading functionality is incorporated and described herein that creates a market for trading syndicated loans and disseminating information about the loans to other participants in the market.

12 Claims, 11 Drawing Sheets

- 401 CONTACT PANEL
- 402 BID HISTORY
- 403 CALL HISTORY
- 404 TRANSACTION LIST

BUYER VIEW

VIEW ALL OR TRANSACTION-SPECIFIC CALL HISTORY

RIGHT CLICK TO VIEW OPTIONS

FIG. 5

SYSTEM AND METHODS FOR TRADING COMPLEX FINANCIAL PRODUCTS

This application hereby incorporates by reference co-pending application Ser. Nos. 10/715,108 and 11/352,252 for all purposes as if fully set forth herein.

BACKGROUND OF THE INVENTION

1. Field of the Invention

The present invention relates to systems and methods for managing the workflow, distribution, and marketplace for syndicated loans.

2. Discussion of the Related Art

A wide variety of commercial debt and loan structures common in corporate financing. While corporate bonds and traditional commercial loans are among the common mechanisms used by institutions to borrow money, there is also a need for a type of loan to finance large debt. In particular, when institutions need to borrow a principal amount that is well in excess of the amount any single bank or lender would be willing to lend, borrowers turn to syndicated loans to raise funds.

The process by which a syndicated loan is formed is illustrated in FIG. 1A. A syndicated loan is a large-scale loan structured and placed by a financial institution, often a bank or experienced credit institution that is referred to as the "lead arranger" or "designated agent" for the loan. The lead arranger organizes a syndicate of financial entities to participate in the financing under terms and conditions set forth in a negotiated contract. Because the syndicate is formed of a groups of lenders each lending a portion of the total principal, the syndicated loan relies very heavily on pre-existing relationships between banks and the issuer. Based on these relationships, the borrowers who are often large and medium-sized companies, business groups and major national construction and real estate projects that require a large amount of credit financed over a long term, are able to access far greater credit than would otherwise be possible.

There are two kinds of syndicated loans. However, because the loans are negotiated between borrowers, issuers, and the syndicate banks, there is a great deal of variation among different syndicated loans beyond their simple categorization.

The first category of syndicated loans is "Direct Syndicated Loans". In the Direct Syndicated Loan, all members of the banking syndicate appoint a correspondent bank that disburses, recovers, and manages the loan. International syndicated loans are mostly direct loans because they are often easier to manage.

The second category of syndicated loans is "Indirect Loans". Here, the lead arranger makes a loan to the borrower, and then sells portions of the loan to other banks. The loan is managed, disbursed and recovered by the lead arranger. Moreover, at the lead arranger's discretion and in accordance with the terms and conditions of the loan, the lead arranger may sell equal portions of the loan at a single price (wherein price reflects term, interest rate, and other factors), or it may break the loan up into pieces according to the amount that purchasers are willing to commit.

Because syndicated loans are aggressively negotiated during their creation, they typically have flexible terms, ranging anywhere from three years to twenty years and beyond. The loan term comprise three periods, namely the available period, the grace period, and the repayment period.

The price of a syndicated loan is made up of both the interest rate and a number of fees. The interest rate may be a fixed or variable interest rate. The fees may include a commitment fee, management fee, agent fee, arrangement fee and miscellaneous fees.

The commitment fee reflects the fact that the bank is committed to providing the remaining portion of the loan, and thus endures losses of interest. The management fee is paid because the lead arranger incurs the costs of organizing the syndicate, drafting documents and negotiating with the borrower. This fee is usually paid within 30 days of signing the loan agreement.

The participant fee is shared among the members of the syndicate according to each member's share of the loan. The agency fee is paid by the borrower to the lead arranger for its management of the loan, interest calculation and loan disbursement. In addition, other miscellaneous fees may be paid to cover expenses incurred when the lead arranger organizes the syndicate by inviting prospective banks to join. These fees can also include printing fees and attorney fees.

The process of forming the syndicate is often very complex, time consuming, and inefficient. When the buyer applies for a syndicated loan to a bank, the bank conducts initial investigation performs a market assessment, and if it finds the project viable, it issues an opinion, or recommendation, regarding the syndicated loan to the borrower. After the borrower accepts the syndicated loan recommendation, it authorizes the lead bank to arrange the syndicate. The borrower must provide the bank with any required documentation, such as shareholder registration documents and financial statements as appropriate.

The lead arranger prints the formal loan document, invites lenders to join the syndicate, and after all participating banks confirm the modified loan document, the borrower will receive the lead arrangers invitation to sign the syndicated loan agreement.

Based on this it is clear that the success of a syndicated loan arrangement depends on tapping existing relationships between banks, but also that the process can be inefficient. In particular, because there is an irregular pipeline of syndicated loans in the debt market, and because there is no clear way to identify relationships between banks unless they are known in advance, it is very difficult for prospective members of the syndicate to determine whether they wish to be part of a particular syndicate or to compare open syndicated loans to one another.

SUMMARY OF THE INVENTION

Accordingly, the present invention is directed to systems and methods for trading complex financial products that substantially obviate one or more of the problems due to limitations and disadvantages of the related art, including systems and methods for automating, streamlining, and managing the process flow of syndicated loans. More particularly, the present invention relates to systems and a method managing the bidding and purchase of portions of a loan principal, including establishing a price for each portion, inviting prospective members of the banking syndicate, managing incoming bids, as well as allowing for variation in the purchase price and structure each portion of the syndicate loan.

In a further embodiment, the system of the present invention provides for a syndicated loan trading desk different from related art financial product trading systems that integrates contact and sales management, deal flow control, deal history to provide for efficient competitive bidding of syndicated loans and efficient solicitation of commitments from syndicate members, in a variety of forms such as spread, fixed amount, or a percentage of principal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is an illustration of an exemplary embodiment of the system present invention;

FIG. 4 is an illustration of an exemplary embodiment of the system present invention;

FIG. 5 is an illustration of an exemplary embodiment of the system present invention;

DETAILED DESCRIPTION OF THE ILLUSTRATED EMBODIMENT

Reference will now be made in detail to embodiments of the present invention, examples of which is illustrated in the accompanying drawings.

According to a first embodiment, the system of the present invention includes four parts: (1) Contact Management and Transaction Surveillance, which serves as the trading desk; (2) Transaction Management, which allows for creating and editing transaction information; (3) Underwriting Managing Rights and Permissions, which provides the security and authentication functions of the system; and (4) Buyer Notification and Invitation.

Each of these functions can be accessed from a variety of different perspectives, or view, depending on the role of the user.

The administrator, or Admin, is a user who has been granted administrative privileges to use the system by accessing it through a website portal. Administrator privileges may vary by user and typically are assigned by role such as Trader, Deal Manager, Underwriter, System Administrator, and Manager.

Figure 1A:
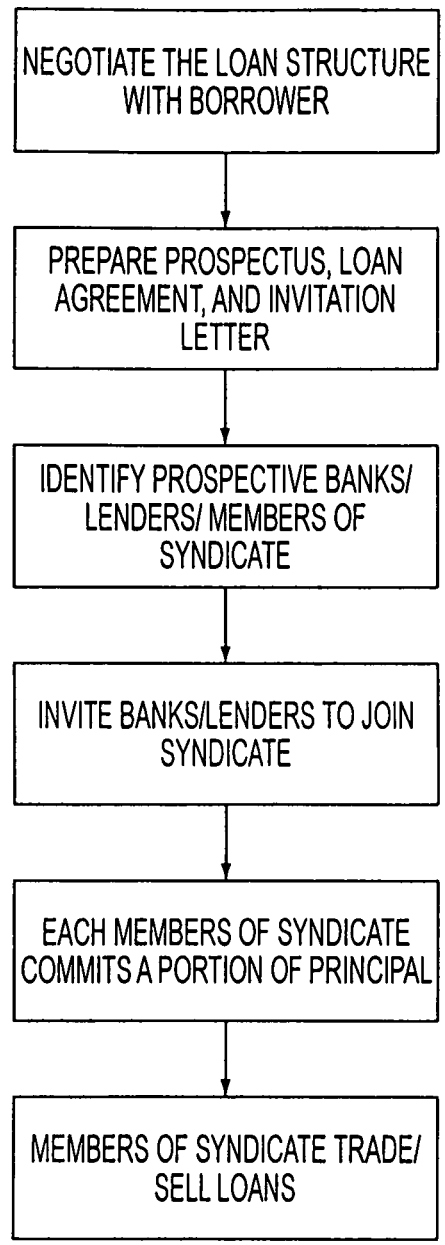
FIG. 1A is an illustration of the process of forming a syndicated loan.
Figure 1B:
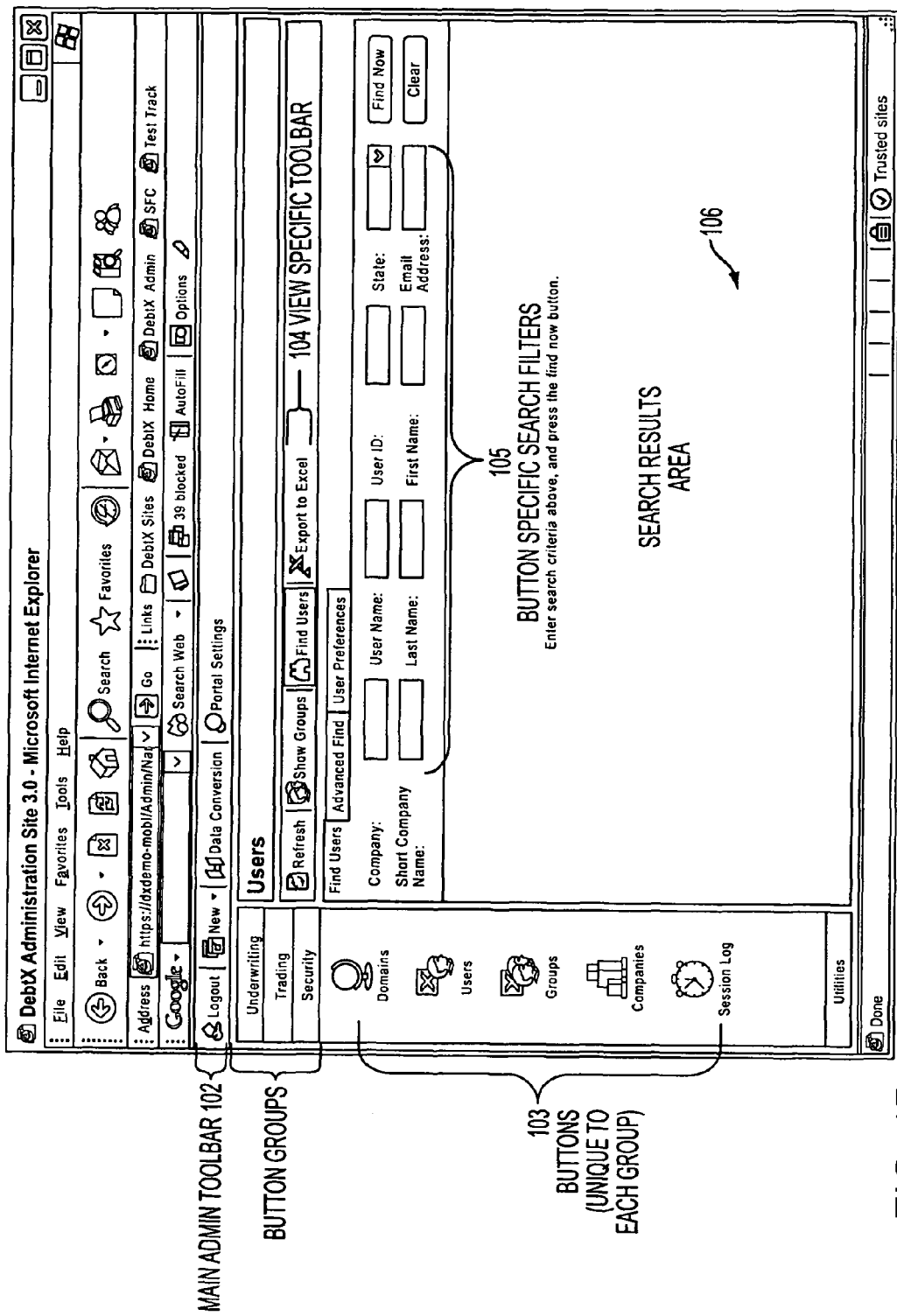
FIG. 1B is an illustration of an exemplary embodiment of the system present invention.

The functions of the Admin are carried out through the Main Admin User Interface (MAUI), illustrated in FIG. 1B. In the present embodiment, administrators are able to access all of the other applications and functional components of the application through the MAUI.

The MAUI includes a number of components. For example, the Main Admin Toolbar (102) is located horizontally across the top of the screen underneath the browser's lowest toolbar. The Main Admin Toolbar contains buttons that are applicable to every screen, including the Logout and New buttons for adding new users, projects or the like. In alternative embodiments, the toolbar could be implemented as a drop-down menu or list of hyperlinks. Each user, such as Trader, Deal Manager, Underwriter, System Administrator, or Manager may see different buttons on the Main Admin Toolbar depending on his or her specific administrative privileges.

A button bar 103 contains button groups, which groups related objects. For example, the Security button group contains buttons for Users and Groups, allowing the Admin to search for and manage information about these objects. In the system according to the present embodiment includes four button groups organized by function: (1) Underwriting, for creating and managing transaction information such as offering settings, asset characteristics, and the like; in addition Issuer Trading Limits ("ITL"), are created and edited through the Underwriting button group; (2) Trading, which provides access to Trading Desk, the primary Contact Management and transaction surveillance application; (3) Security, from which user permissions can be managed; and (4) Utilities, including miscellaneous items such as Auto Email and Reports.

Furthermore, specific functionality may be available depending on the selected button, for which pressing the button creates a "view". This functionality is accessed or from items in the "View Specific" toolbar 104. Examples of this functionality include exporting data to Excel, displaying additional views, or refreshing search result data sets.

While all Administrative navigation begins from the MAUI 100, other information on the system can still be accessed. Search functionality 105 to find desired information on users, companies, transactions, and other system objects is provided. View specific search filters include common fields that enable an Admin to find the appropriate objects. The search results are displayed in the search results area 106.

Figure 2:
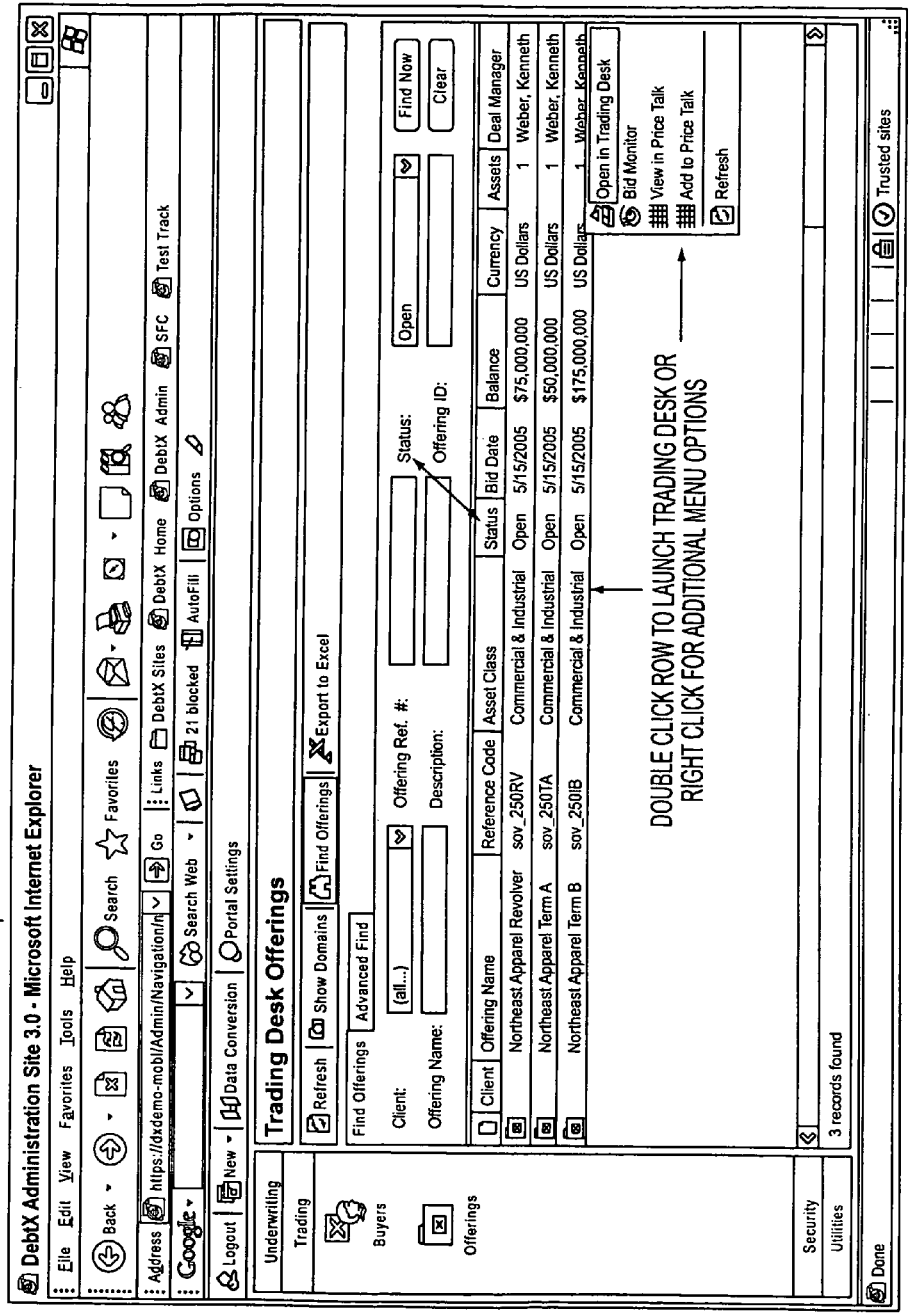
FIG. 2 is an illustration of an exemplary embodiment of the system present invention.

While the MAUI provides access to all of the administrative functions of the system in the present embodiment, the Trading Desk 200, illustrated in FIG. 2 provides for investor contact management and transaction surveillance. The Trading Desk 200 allows Admins to track specific investor information against specific deals on both an automated as well as manual basis.

The Trading Desk 200 is where Admins regularly interact with investors and transactions. It provides access to historical performance metrics, and allows Managers to view activity across all investors on all active transactions. Most importantly, Trading Desk institutionalizes the process by capturing buyer activity automatically, enabling organizations to store and utilize knowledge and information learned over time.

As noted above, the Trading Desk 200 is accessed from one of the button groups 103 of the MAUI. The Trading Desk can be accessed in two ways, by buyers/investors and by offerings.

The Trading Desk 200 provides a number of different views into the deal information stored in the system. Among these views are a Transaction View for viewing all information relative to a specific transaction; a Buyer View for viewing all information relative to a specific investor; Price Talk for viewing a Transaction/Buyer matrix; and a Session Log for viewing investors who are actively logged into the system. Thus not only does the Trading Desk 200 provide information about the offerings and investors from a static perspective, but it also provides a real-time view of how those investors are behaving with respect to those offerings.

Figure 3:
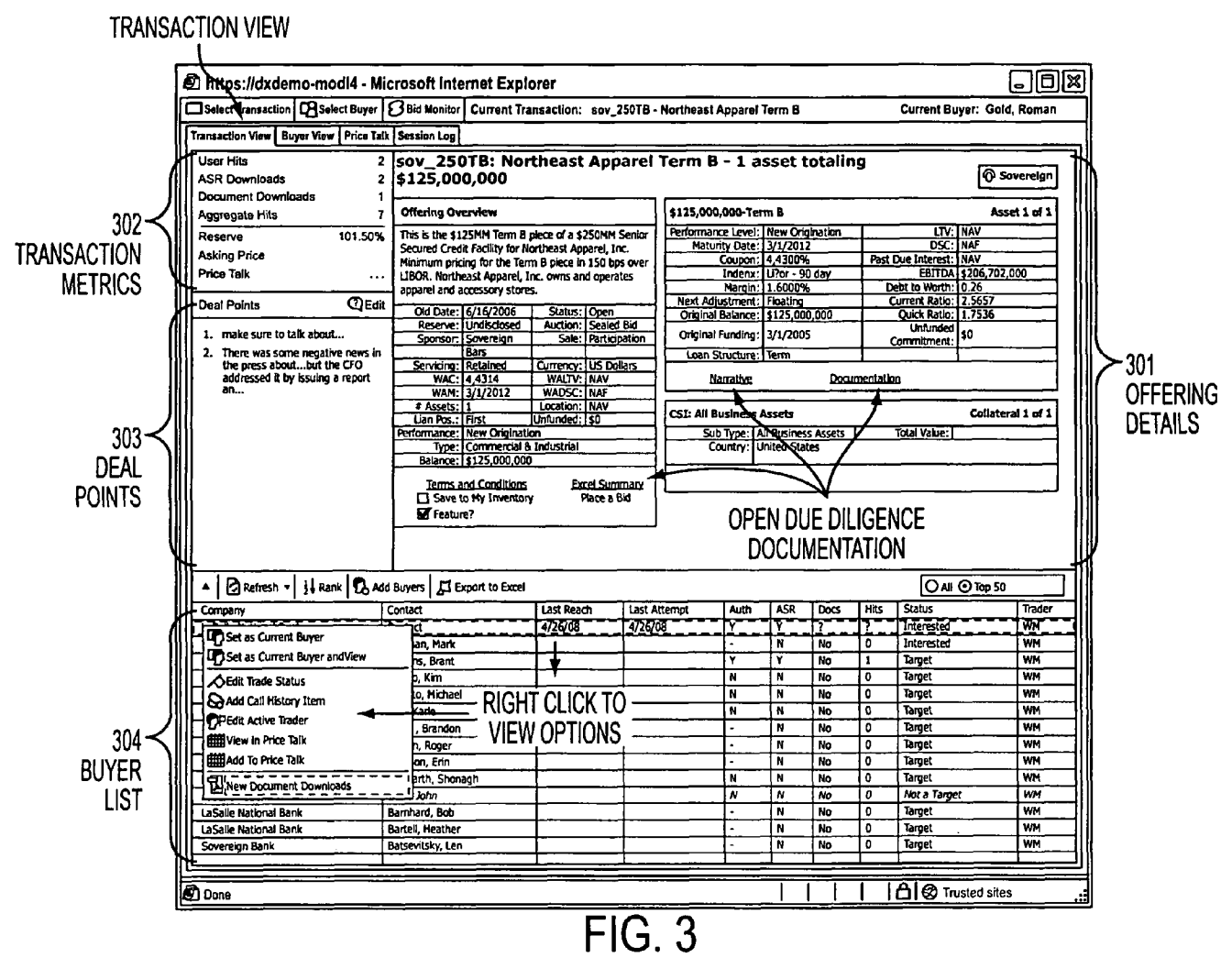

The transaction view 300, illustrated in detail in FIG. 3, provides all relevant information relative to a specific transaction. In particular, the transaction view 300 provides the offering details 301 containing the same information investors see when they use the system to conduct due diligence on a transaction through the investor due diligence feature of the system. The Trader/Salesperson may access all due diligence information and documentation from this pane.

Furthermore, transaction metrics 302 are provided. These metrics 302 are provided to give the Trader or Manager an overview of investor activity relative to the specific transaction. The metrics include the number of investors who have viewed the offering details page, downloaded summary information, and downloaded detailed due diligence documents. It also displays the reserve and asking prices as well as the price talk range obtained through conversations with investors (discussed below).

The transaction view 300 also displays "Deal Points" 303. This is an editable list of information relating to the transaction, including problems, reminders for Traders, and mitigating factors, as well as any other relevant information a Trader should know about a deal. This is particularly useful in ensuring that multiple Traders working on the same transaction provide a clear and consistent position to all prospective investors.

A buyer list 304 is a ranked listing of all investors who are being tracked or have been invited to participate on a transaction. These investors correspond to the banks invited to join in the syndicate by the lead arranger. The buyer list displays several columns of pertinent information including the contact identity, last contact dates, summary and detailed due diligence interaction, as well as the investor's overall trade status, set automatically via the investor's interaction with the due diligence documents or manually overridden by the Trader.

In addition, the buyer list also shows whether an investor has been invited or is simply being tracked as a prospective investor for possible invitation. The buyer list 304 also includes the capability to perform actions 305 on a buyer in the list, such as recording a call history or reviewing in detail the specific document review logs for that investor/transaction combination. For example, the multi-select function is particularly useful for setting the Trade Status of multiple investors at once or to add investors to the Price Talk grid. In addition, the interface can highlight investors that are currently logged into the front end due diligence system or that are explicitly denied permission to view a transaction (because they have not been invited, for instance).

The Buyer View 400 (illustrated in FIG. 4) of Trading Desk 200 provides all relevant information relative to a specific investor. The Buyer View 400 includes a Contact Panel 401 contains all general contact information about the buyer including typical contact information, as well as more system specific items such as registration information and preferences. An investor's contact profile may be edited by Administrators from within the Buyer View 400. The buyer View 400 also includes a Bid History 402 listing metrics detailing the Buyer/investor's past participation and performance on deals brokers on the system of the present invention. Standard metrics include the number of bids, bids won, winning percentage, average bid as a percentage of the highest bid, number of offerings reviewed, and the most recent bid date. Traders may review specific details by clicking a particular metric.

The Buyer View 400 further includes a call history 403 implementing some of the sales management features of the system. The call history 403 contains all comments recorded by Traders interacting with this buyer. The Trader may record a general comment or may tie the comment to a specific transaction. This allows Traders to look at all comments relating to this buyer across all deals or just filter on the specific deal in question. This clarifies the status of past and present relationships between the buyer and traders. For example, the system can display call histories recorded by all Traders relative to the investor being viewed, creating a shared knowledge base among Traders.

The Buyer View 400 includes a Transaction List 404 as well. This shows all transactions relative to the buyer and displays columns of data to show how the buyer has interacted with the transactions, for example whether due diligence documents have been downloaded.

Figure 5:
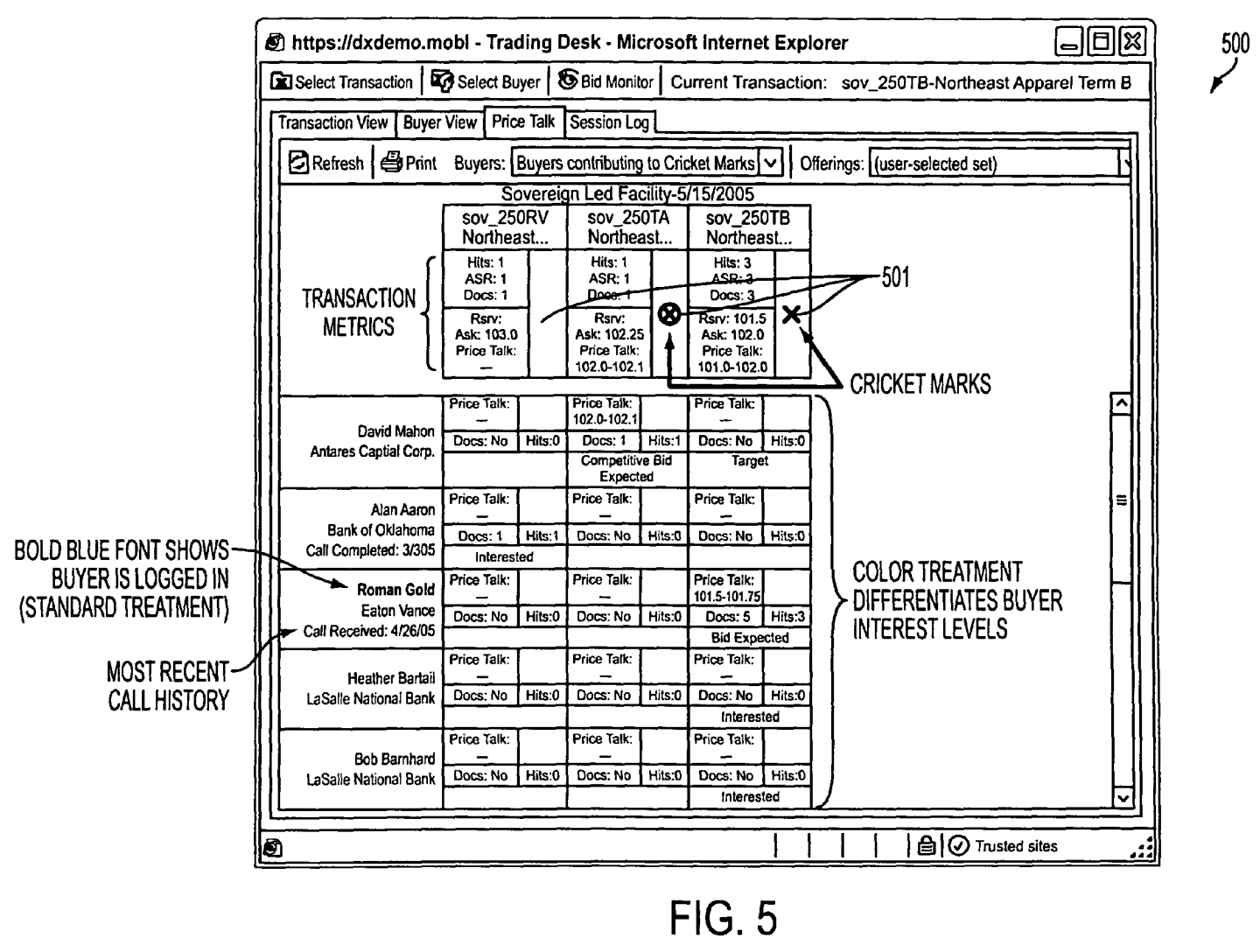

The third view of the exchange of the system is provided by the Price Talk view 500, illustrated in FIG. 5. From this view 500, a Trader or Manager can view multiple offerings against multiple buyers. In the embodiment presently discussed and illustrated in FIG. 5, the information is presented in a matrix format, but a variety of other information presentation formats are contemplated as well. The primary purpose of this screen is to provide a snapshot of the status of any or all transactions in a single view instead of viewing each transaction or each investor individually. The Price Talk view, in essence is a snapshot of the syndicated loan market as it exists in the exchange of the present invention.

While the Price Talk view 500 includes a great deal of information, it also provides transaction metrics and a visual indication of the relative coverage of each transaction in the form of a "Cricket Mark" 501. The Cricket Mark, based on the Trade Status across all buyers on a transaction, is displayed in symbol form as illustrated in Table 1:

| Deal | CoverageSymbol |
| --- | --- |
| Low | — |
| Light | / |
| Good | X |
| Excellent | (x) |

Like all other Trading Desk views, an Admin may interact with the data on the page to update information relative to any buyer-transaction relationship or to navigate to a particular buyer or transaction.

Figure 6:
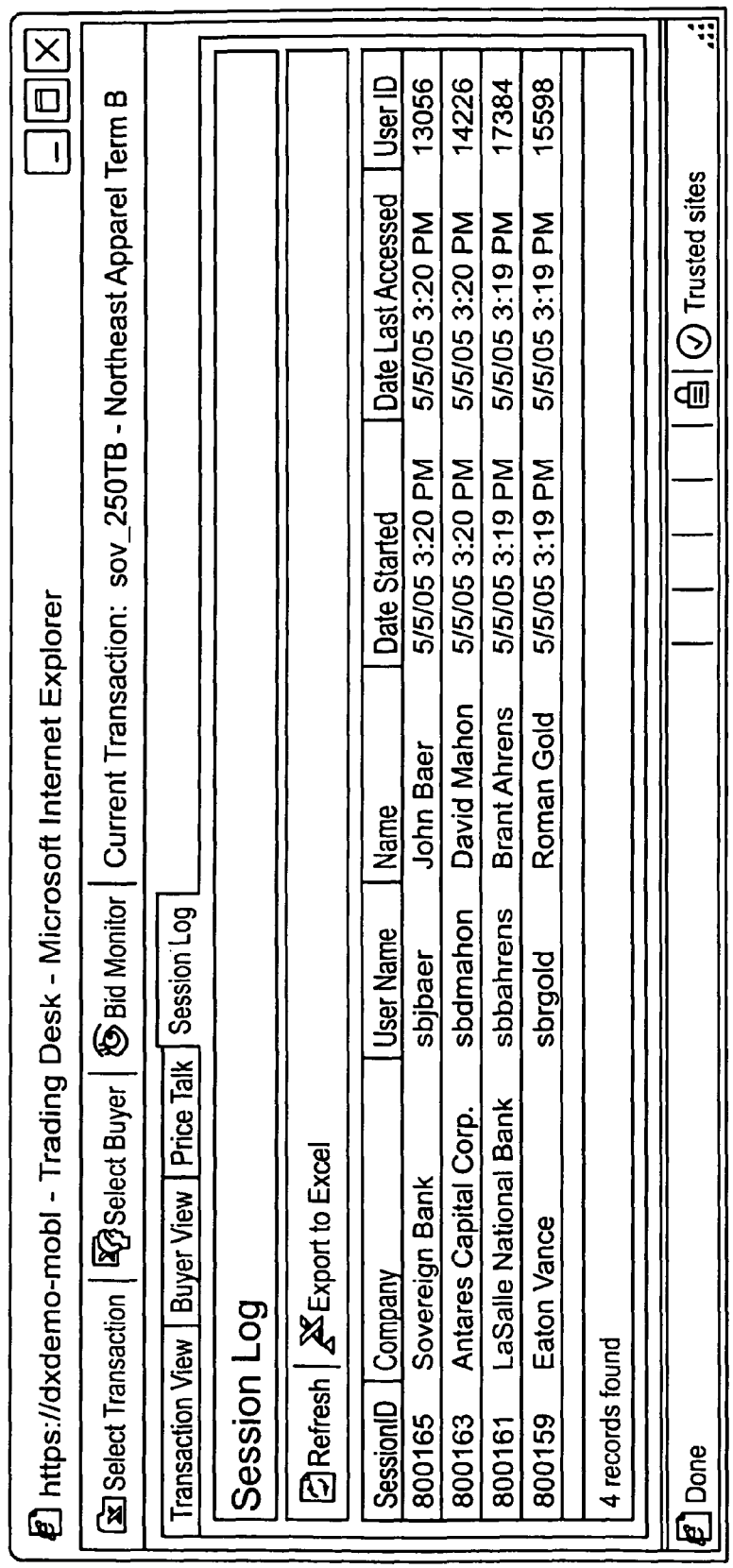
FIG. 6 is an illustration of an exemplary embodiment of the system present invention.
Figure 7:
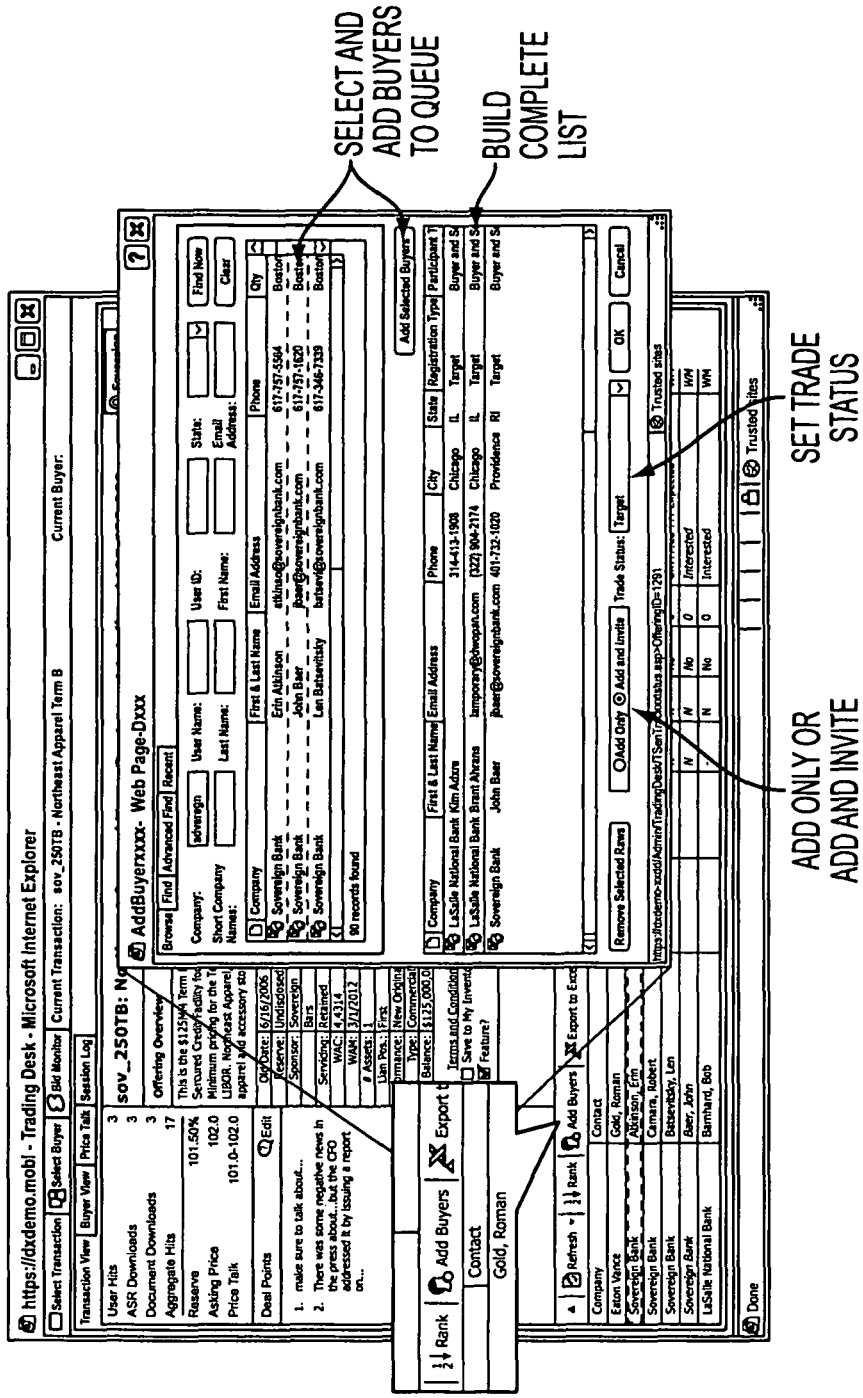
FIG. 7 is an illustration of an exemplary embodiment of the system present invention.

The final view according to the present embodiment is the Session Log 600, illustrated in FIG. 6. The Session Log is a simple view to display which buyers are currently accessing the due diligence system. This is normally used as a tool to determine which individuals are presently accessible by telephone. If an online auction and bidding system is used, it is also a good tool to determine whether expected bidders have signed in to submit bids as the bid deadline approaches.

As noted earlier, syndication loans require the lead arranger to invite investors to participate on the loan as members of the syndicate. The system of the present invention provides a mechanism for lead arrangers to perform this task efficiently. For example, according to an embodiment of the present invention, investors may be added or invited to review a transaction by creating or editing a buyer list. Adding investors allows calls to be tracked for the specific transaction, but does not grant permission to allow "added" investors to access transaction information through the investor web site. Inviting investors adds them to the transaction, but also generates permissions that enable investors to access the transaction through the investor web site and places "invited" investors in queue to receive an invitation email.

Once buyers are added to the list, the Trade Status for the investors is typically set to "Target". When the investors are invited, the system automatically invokes the Auto Email application so the Admin can review, edit, and send the email invitation. Buyers who receive an invitation may be automatically granted access to review the asset and navigate directly to the Offering Detail page by clicking a link provided in the email.

Uninviting a buyer from a transaction simply removes his permission to access the transaction, but it does not necessarily mean that the buyer is removed from the list.

In addition, various aspects of this embodiment may allow batching or the inviting of multiple investors to multiple transactions. Furthermore, this functionality may be carried out from the MAUI rather than the trading desk.

The Auto Email application allows communication with investors on several levels, including to invite them to and update them about transactions. The Auto Email application itself may be implemented as a wizard or as a standalone or web application assisting the user to construct the appropriate mailing.

Figure 8:
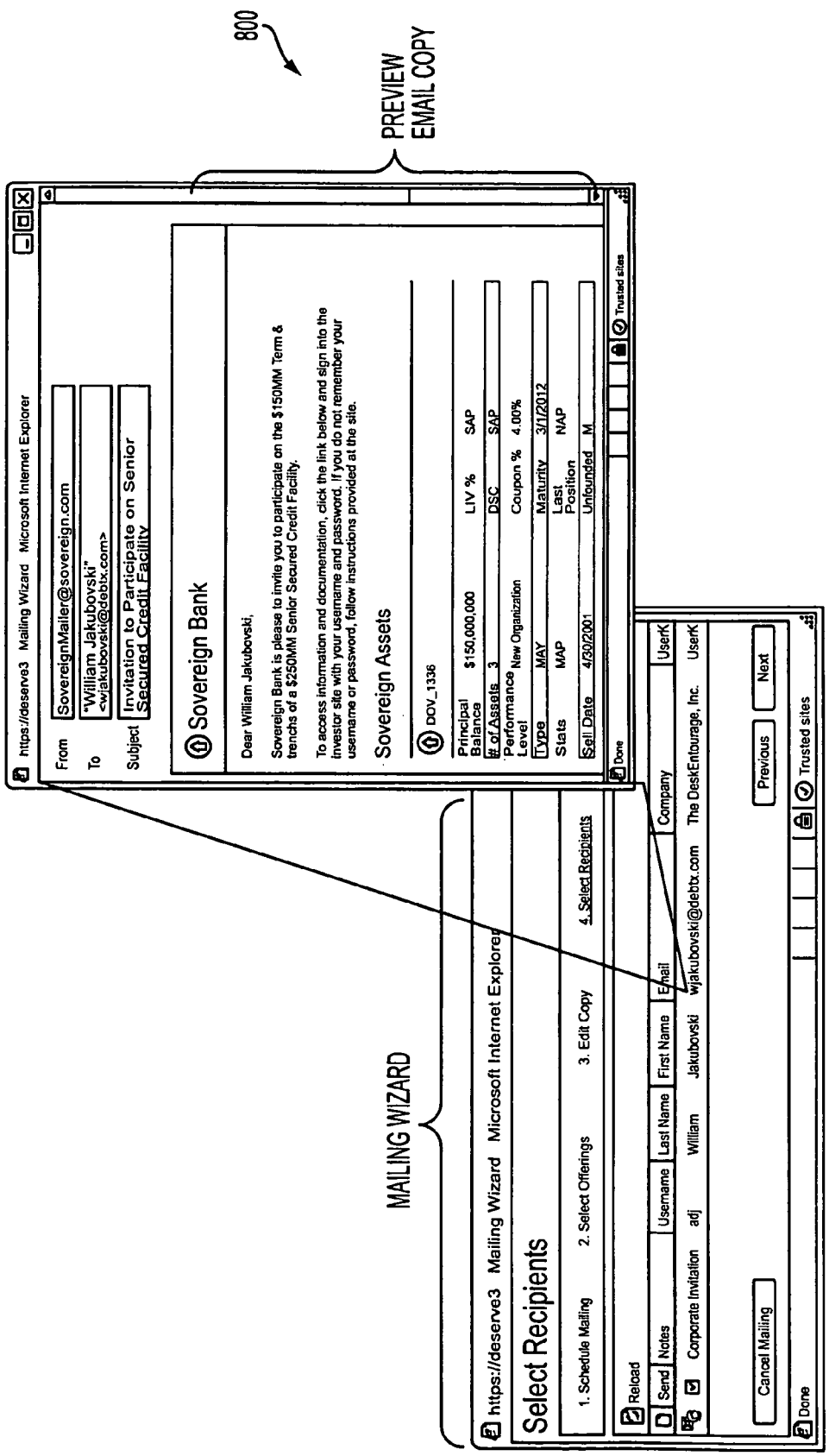
FIG. 8 is an illustration of an exemplary embodiment of the system present invention.

The Auto Email application, according to one embodiment, provides for scheduling mailings, selecting offerings, edit the email, select recipients, and confirming distribution. The invitation email wizard illustrated in FIG. 8 is invoked automatically whenever an investor is invited to participate on a transaction. Whether from the Trading Desk or MAUI, the system automatically opens the Auto Email wizard and allows the invitation to be completed. If the email wizard is invoked from the Trading Desk, all necessary information is already populated in the wizard. It is only necessary to complete the steps to confirm the information is accurate or to customize any default settings if desired. The actual email message to be sent may also be previewed.

Figure 9:
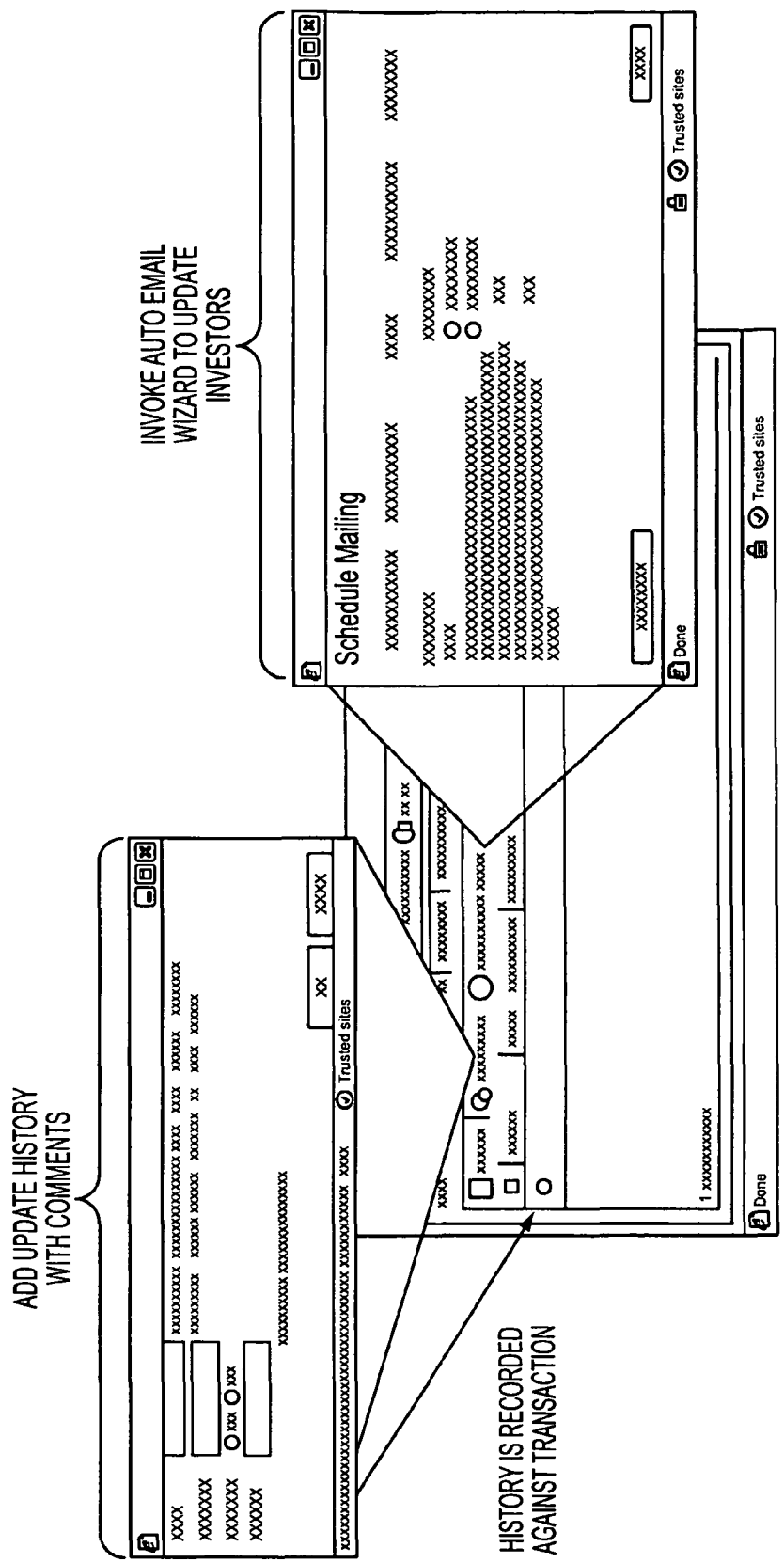
FIG. 9 is an illustration of an exemplary embodiment of the system present invention.

The update email wizard, illustrated in FIG. 9, includes two steps. First, it is necessary to create an updated history, 901, on the asset itself. This is done from the Asset editor. Once the update history has been added, the auto email wizard may be launched to automatically populate the relevant information. As with the invitation email, it is only necessary to go through the wizard to confirm or edit default settings.

Figure 10:
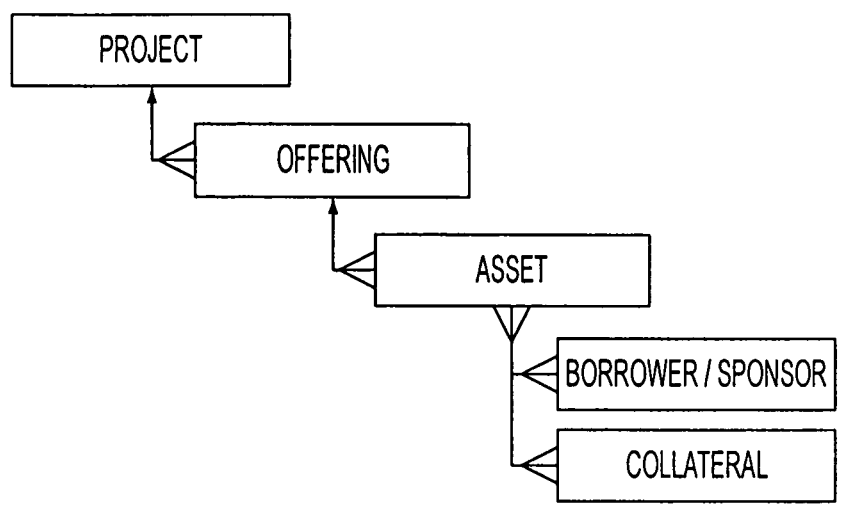
FIG. 10 is an illustration of an exemplary embodiment of the system present invention.

In addition to managing investors and users, the system of the present invention allows for the creation and modification of transactions and their underlying components—assets and borrowers, for example The transaction data model according to one embodiment of the present invention, illustrated in FIG. 10, specifically refers to the relationships among the various component objects that make up a transaction. The data model defines how Issuer Trading Limits ("ITL"), offerings, or specific details about a given transaction are created.

In the data model, a Project is an object that contains all other related transaction components, including an ITL. An ITL is a convenient and powerful way to create new transactions because the ITL automatically generates the related Asset, Borrower, and Sponsor records in the system. Thus, the ITL (project) has specific information about the ITL itself (e.g. Approval Signatures), and also includes information about other transaction components such as Assets, Borrowers, and Sponsors, and the like.

An Offering is a wrapper-object that contains one or more Assets. It contains information about the terms of sale, such as the bid date, bid format, and other relevant information. Additionally, offering documents such as a Syndication Agreement are associated at the Offering level.

The Asset (Loan) is the actual object offered for sale. The Asset contains standard information about its terms (e.g. Current and Original Balances, Structure, Original Note Date, Maturity, etc.), Interest Rate (Type, Underlying Index, Spread, Accrual Method, etc.) and other relevant items. In addition to the various fields that make up the Asset, loan documentation such as the Note, Credit Agreement, and other items are managed at the Asset level.

An Asset may contain one or more Borrowers or Sponsors. In the system, the same Borrower or Sponsor may be associated with multiple Assets. For example, in a Credit Facility that includes a Revolver, Term A, and Term B loans (3. Assets) the system would have a single Borrower record associated with all three Assets. Like any other object in the system, the Borrower contains standard fields such as the Name, Address, Financials, and the like.

An Asset may contain zero (unsecured) or more Collateral records. Like the Borrower object, the same Collateral may be associated with multiple Assets in the case where multiple Assets have claim to the collateral.

In the present embodiment, creating and opening an ITL can be done from the MAUI by select the Project button from the Underwriting button group. The search filters can be used to find the appropriate ITL Creating an ITL establishes the underlying Asset and Borrower objects, but does not create an Offering. As defined above, an Offering is a wrapper-object that contains one or more assets. The Offering is the mechanism that enables the sharing of information about assets with prospective buyers.

If the Project contains existing offerings, they will be listed in table format. Furthermore, one or more Assets may be associated with the offering. By associating the various components, the system automatically populates the appropriate information to the buyer due diligence and bidding applications.

Syndicated loan transaction involve voluminous due diligence documents. Documents may be uploaded from any of the transaction component dialogs except the borrower.

Once files have been uploaded, a Document Management application can create a Table of Contents ("TOC"), add, remove, reorder, and view documents, etc. Furthermore, summary materials and hard due diligence materials may be distinguished. The ranking algorithm in Trading Desk uses this activity to compute an investor's score relative to the transaction as the investor interacts with due diligence documentation.

Documents are associated with Offerings and Assets. This association determines where a prospective buyer accesses the documents on the investor due diligence system. If a document is associated to the Offering, investors access these documents by clicking the Terms and Conditions link on the Offering Detail page. If documentation is associated with the Asset, investors can access these documents through the Documentation or Asset Summary Report links on the Offering Detail page.

Security against investors is managed almost entirely by inviting or uninviting investors to transactions. In addition, the system of the present invention contemplates integrates any of a variety of well known security and authentication schemes into the system, databases, and interfaces to ensure that the integrity of the data is maintained.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An automated system for managing syndicated loans, comprising:
   a Contact Management and Transaction Surveillance portion accessible to an administrator through a website portal for managing lenders of a syndicated loan and for trading portions of said syndicated loan; and
   a Transaction Management portion accessible to the administrator through a website portal for creating and editing transaction information and providing a transaction view for the syndicated loan that includes:
   offering details for the syndicated loan including due diligence information associated with the syndicated loan,
   transaction metrics including a number of the lenders who have viewed the offering details for the syndicated loan, a reserve price for the syndicated loan, an asking price for the syndicated loan, and a price talk range based on inputs received from the lenders, and
   a list of buyers for the syndicated loan including an identity for each lender that is invited to join in the syndicated loan and a trade status for each lender that is based on whether the lender has viewed the due diligence information.

2. The system for managing syndicated loans according to claim 1, wherein the Contact Management and Transaction Surveillance portion is configured to receive information regarding use of the system to access the due diligence information associated with the syndicated loan by the buyers.

3. The system for managing syndicated loans according to claim 1, wherein the Contact Management and Transaction Surveillance portion is configured to retrieve historical participation information related to past syndicated loans associated with the buyers.

4. The system for managing syndicated loans according to claim 1, wherein the Contact Management and Transaction Surveillance portion is configured to log comments from the buyers related to a plurality of syndicated loans that are managed by the system.

5. The system of claim 1, wherein the buyer list further includes an indication of whether each buyer has actually been invited to join in the syndicated loan or is a target for possible invitation to join the syndicate loan.

6. The system of claim 1, wherein the buyer list further includes a date that each buyer was last contacted regarding the syndicated loan.

7. The system of claim 1, wherein selection of a buyer on the buyer list allows viewing of a telephone call history for the buyer that includes comments from traders that have interacted with the buyer.

8. The system of claim 1, wherein selection of a buyer on the buyer list allows viewing of a log of when the buyer has viewed information regarding the syndicated loan.

9. The system of claim 3, wherein the Transaction Management portion further includes a buyer view that includes a number of bids for syndicated loans that have been placed by the buyer that is based on the retrieved historical participation information.

10. The system of claim 9, wherein the buyer view further includes a percentage of bids for syndicated loans that have been won by the buyer.

11. The system of claim 9, wherein the buyer view further includes a number of syndicated loans that have been viewed by the buyer.

12. The system of claim 10, wherein the buyer view further includes a date that the buyer most recently placed a bid for one of the syndicated loans.

* * * * *